(12) United States Patent
Rogö et al.

(10) Patent No.: US 10,031,566 B2
(45) Date of Patent: Jul. 24, 2018

(54) ON BOARD UNIT WITH POWER MANAGEMENT

(71) Applicant: Kapsch TrafficCom AB, Jönköping (SE)

(72) Inventors: Johan Rogö, Habo (SE); Robert Povolny, Vienna (AT); Markus Krapfenbauer, Vienna (AT); Heinz Liebhart, Vienna (AT)

(73) Assignee: Kapsch TrafficCom AB, Jönköping (SE)

( * ) Notice: Subject to any disclaimer, the term of this patent is extended or adjusted under 35 U.S.C. 154(b) by 162 days.

(21) Appl. No.: 14/411,027

(22) PCT Filed: Jul. 3, 2013

(86) PCT No.: PCT/EP2013/064075
§ 371 (c)(1),
(2) Date: Dec. 23, 2014

(87) PCT Pub. No.: WO2014/006111
PCT Pub. Date: Jan. 9, 2014

(65) Prior Publication Data
US 2015/0169018 A1 Jun. 18, 2015

(30) Foreign Application Priority Data

Jul. 3, 2012 (EP) .................................... 12174784

(51) Int. Cl.
*G06F 1/26* (2006.01)
*G07C 5/00* (2006.01)
(Continued)

(52) U.S. Cl.
CPC ............. *G06F 1/26* (2013.01); *G07B 15/063* (2013.01); *G07C 5/008* (2013.01); *G08G 1/096783* (2013.01)

(58) Field of Classification Search
CPC ................................... G06F 1/26; G07C 5/008
(Continued)

(56) References Cited

U.S. PATENT DOCUMENTS

| | | | | |
|---|---|---|---|---|
| 5,533,058 A | * | 7/1996 | Kady et al. | 375/317 |
| 6,104,333 A | * | 8/2000 | Wood, Jr. | 341/173 |
| 6,265,963 B1 | * | 7/2001 | Wood, Jr. | 340/10.4 |

FOREIGN PATENT DOCUMENTS

| | | |
|---|---|---|
| DE | 19605654 A1 | 8/1996 |
| EP | 0676727 A2 | 10/1995 |

(Continued)

OTHER PUBLICATIONS

Extended European Search Report received for European Patent Application No. 12174784.4, dated Nov. 7, 2012, 7 pages.

(Continued)

*Primary Examiner* — Khoi H Tran
*Assistant Examiner* — Majdi Alsomiri
(74) *Attorney, Agent, or Firm* — Fiala & Weaver P.L.L.C.

(57) ABSTRACT

Described are an on board unit (OBU) and a method to control an OBU within a communication zone of a road side unit (RSU), said OBU can be set into an active mode and a sleep mode. Said OBU is set into sleep mode upon receiving a release command from said RSU, and the OBU electronics are shut down so no or a minimum of power is consumed, and is set into active mode when entering said communication zone. A communication unit of said OBU is thereby powered such that the OBU can communicate with said RSU. Said OBU can be set into a tracking mode by said RSU, whereby in said tracking mode at least said communication unit is shut down and a timer is activated in said OBU, such that said OBU can restart said communication unit within a specified time limit from when it is shut down.

20 Claims, 2 Drawing Sheets

Figure 1:
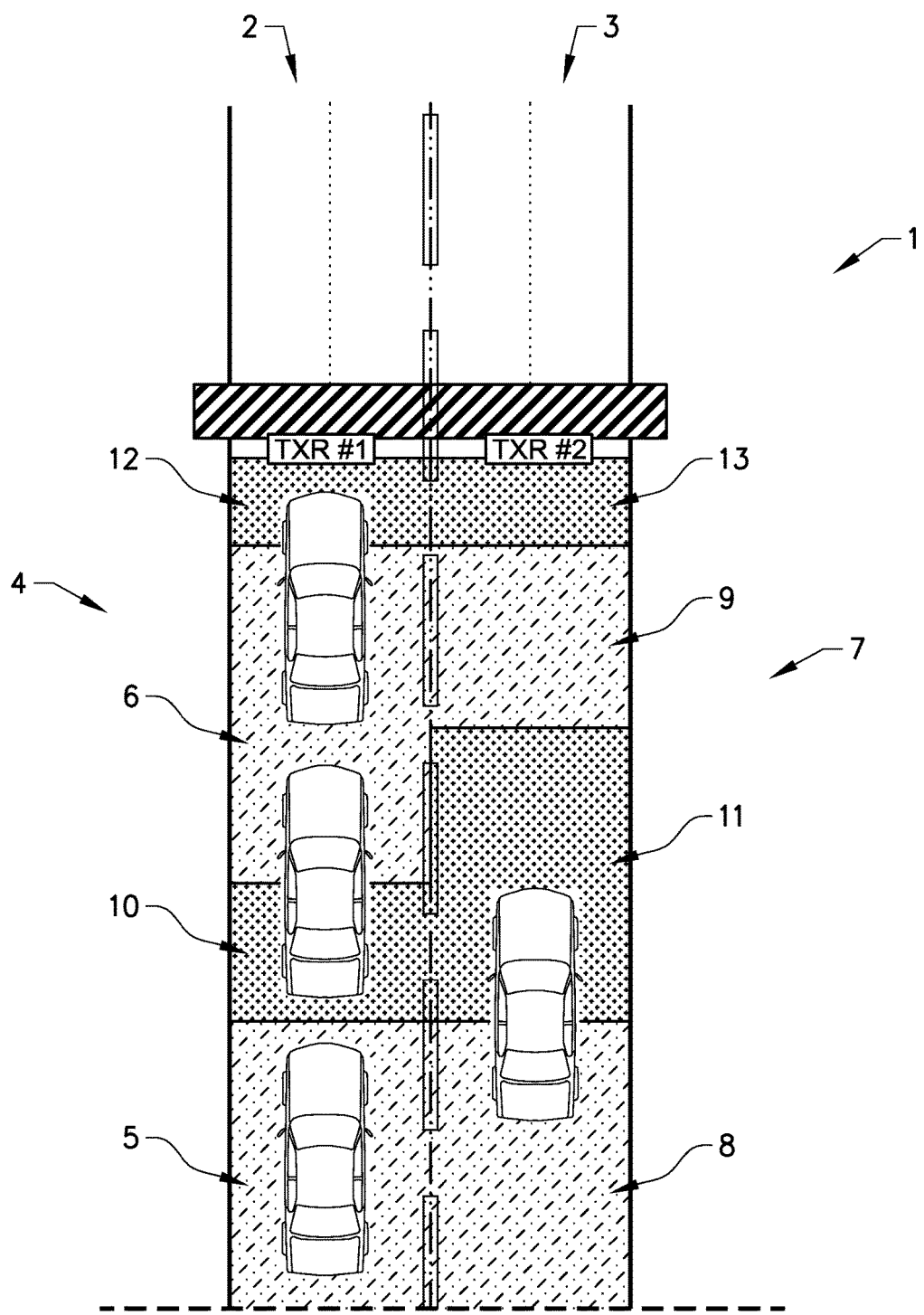

(51) Int. Cl.
*G08G 1/0967* (2006.01)
*G07B 15/06* (2011.01)

(58) Field of Classification Search
USPC .............................................. 701/2
See application file for complete search history.

(56) References Cited

FOREIGN PATENT DOCUMENTS

| | | |
|---|---|---|
| EP | 1643654 A2 | 4/2006 |
| WO | 1998/027441 A1 | 6/1998 |
| WO | 2014/006111 A1 | 1/2014 |

OTHER PUBLICATIONS

Kapsch Trafficcom, "Global Specification for Short Range Communication", Version 3.2, Aug. 2003, pp. 1-59.
RCI Project Consortium, "Road Charging Interoperability. Minimum Architecture for Interoperability", vol. Work Package 3, Deliverable D3.3, No. Version 1.01, Feb. 1, 2007, pp. 1-191.

* cited by examiner

ON BOARD UNIT WITH POWER MANAGEMENT

CROSS-REFERENCE TO RELATED APPLICATION(S)

This application is a U.S. national phase of International Application No. PCT/EP2013/064075 filed on Jul. 3, 2013, which designated the U.S. and claims priority to European Patent Application No. 12 174 784.4, filed on Jul. 3, 2012, the disclosures of which are herein incorporated by reference in their entireties.

BACKGROUND

Technical Field

The present subject matter relates to a method to control an on board unit (OBU) within a communication zone of a road side unit (RSU). Said OBU can be set into an active mode and a sleep mode. In said sleep mode the electronics of said OBU may thereby be shut down, such that no or a minimum of power is consumed. The OBU is set into said active mode when said OBU is entering said communication zone, whereby a communication unit of said OBU thereby is powered such that the OBU can communicate with said RSU. The subject matter further relates to an on board unit capable of communicating with a road side unit.

Background Art

Electronic Fee Collection (EFC) stations and related systems, sometimes called road side stations comprises road side units (RSU) that may communicate with an on board unit (OBU) located in a vehicle. When the vehicle approaches an RSU the OBU is activated upon reception of a certain wake-up command that is sent from the RSU in order to perform a transaction. The transaction may be payment for the toll and/or an access transaction where the RSU opens a gate or similar for the vehicle to pass through. Even if the transaction only takes place in a specific zone close to the RSU the OBU is active from the moment the OBU is within range to be activated by the RSU until the moment the OBU receives a release command from the RSU.

It may further be desirable to determine the position of the OBU, and thereby of the vehicle. For this purpose various means of localization features in an RSU may exist that based on a received signal from the OBU can estimate the OBU's location. Hence, for systems where it is desired to also know the location of a vehicle outside the actual zone of data exchange that is needed for the transaction itself there is a need to get the OBU to send arbitrary data in data frames called tracking frames that the RSU can use for localization means. This inherently means that the OBU consumes a lot of power idling while waiting for a command from the RSU to send such a tracking frame. For an OBU that is battery powered this severely reduces the battery power and thereby reduces the time the OBU can be used before the battery is drained.

There is thus a need for an improved method of controlling an OBU by an RSU.

BRIEF SUMMARY

An object of the present subject matter is to provide an inventive method for controlling an on board unit (OBU) within a communication zone of a road side unit (RSU) where the previously mentioned problems are at least partly avoided. This object is achieved by the features of the characterising portion of claim 1, namely that said OBU can be set into a tracking mode by said RSU, whereby in said tracking mode at least said communication unit is shut down and a timer is activated in said OBU, such that said OBU can restart said communication unit within a specified time limit from when it is shut down.

Said object is further achieved by an OBU as provided in claim 9.

The present subject matter relates to a method to control an on board unit (OBU) within a communication zone of a road side unit (RSU), said OBU can be set into an active mode and a sleep mode, wherein the OBU is set into;

said sleep mode when said OBU receives a release command from said RSU, and the electronics of said OBU thereby is shut down, such that no or a minimum of power is consumed, and said active mode when said OBU is entering said communication zone, whereby a communication unit of said OBU thereby is powered such that the OBU can communicate with said RSU, wherein said OBU can be set into a tracking mode by said RSU, whereby in said tracking mode at least said communication unit is shut down and a timer is activated in said OBU, such that said OBU can restart said communication unit within a specified time limit from when it is shut down.

The method can thus be said to control the behaviour of an on board unit (OBU) within a communication zone of a road side unit (RSU). Said OBU can set up a connection to an RSU as well as being released from the connection by the RSU upon receiving a release command from the RSU. A release command from the RSU typically leads to that a battery powered OBU makes a transition to a sleep mode. The OBU receives a release command from said RSU when said RSU has completed a transaction with said OBU. The electronics of said OBU may thereby be shut down, such that no or a minimum of power is consumed. The OBU may be set into said active mode when said OBU is entering said communication zone by receiving a wake up command from the RSU, whereby a communication unit of said OBU thereby is powered such that the OBU can communicate with said RSU.

An OBU operating according to embodiments may thus be set into a tracking mode by the RSU when entering a communication zone instead of being continuously active throughout the entire communication zone. One advantage with this feature is that the power consumption of the OBU is considerably reduced in the cases where a vehicle equipped with an OBU is in the communication zone of an RSU but has not yet entered the transaction zone where the data exchange between the RSU and the OBU that is needed in order to perform the intended application occurs. The data exchange in a transaction typically means that a certain OBU specific data, called attributes, are read and written by the RSU. The attributes of interest varies depending on application. The application may be payment for the toll, having the OBU beeping at an exact location and/or an access transaction where the RSU opens a gate or similar for the vehicle to pass through. Other applications suitable are also possible.

The tracking mode of the OBU is controlled by a timer which enables the OBU to make a transition between said tracking mode and said active mode after a time limit is exceeded. In the active mode the OBU transmits tracking frames that the RSU can use for localization purposes to determine whether the OBU has reached the targeted transaction zone where the transaction shall take place. If the OBU has not yet reached the transaction zone the OBU reverts to the tracking mode after a time-out as set in the command that initiated the tracking mode, or a new such command has been received from the RSU, and waits for a period of time before making the transition to the active mode again. A typical time between two successive active periods is in the range of 20-50 ms. The on-time for each period is typically in the range of 5-10 ms.

The protocol used for tolling is defined in IEEE 1609.11 and is based on a master-slave concept where the RSU is the master and the OBU is the slave. IEEE 1609.11 is part of the family of standards for Wireless Access in Vehicular Environments (WAVE). One of the basic features of the WAVE standard is that any two WAVE devices can setup an ad-hoc network exchanging information. This inherently means that a WAVE OBU utilizes a full WAVE transceiver and can transmit data itself without any interaction from the RSU.

Today some applications require that the OBU is tracked through the communication zone in order to trigger location dependent events like opening of a barrier or having the OBU beeping at an exact location. Other installations require synchronization between the OBU position and other sensors such as a camera or ground loops. The tracking of an OBU within the communication zone for these installations results in an active time of the OBU that might be considerably longer than expected, and in some cases, e.g. during queues or common stop and go traffic, this drastically reduces the battery life time of the OBU.

As described the present subject matter reduces the active time of the OBU within the communication zone considerably, by setting the OBU in a tracking mode of operation where it is only required to be active for a very short time interval transmitting tracking frames that the RSU can use for localization of the OBU within said communication zone at a predefined repetition period.

Said OBU may boot up to active mode from said sleep mode before being set into said tracking mode.

The OBU may need to boot up to be set into said active mode from said sleep mode. The OBU may receive a wake up command from the RSU when the vehicle approaches or enters the communication zone. During boot up the OBU loads all the necessary software and starts the necessary hardware. If the OBU enters the communication zone but is not in a position where the transaction shall take place, the OBU, if requested so by the RSU, enters the tracking mode by shutting down at least the communication unit. This means that the OBU is still booted up but has entered a power saving mode. The fact that the OBU is booted up means that less time is needed for the OBU to make a transition from the tracking mode to active mode than from the sleep mode to active mode. This enables the function of the OBU to be ready for a transaction while saving power compared to being in a continuous active mode.

At least one register may be kept in a memory of the OBU enabling the OBU to being set into said tracking mode without having to boot up.

As stated above the OBU does not need to boot up when the OBU makes a transition from the tracking mode to the active mode. During the boot up the OBU is setup for being able to communicate with another device, and in the initialisation phase of the transaction, RSU unique information needed for subsequent communication are transferred to the OBU. This information may be stored in the OBU's memory when entering the tracking mode. Other relevant data and register information loaded during boot up may also be stored in the OBU's memory. Having this information available in the OBU enables a very fast transition between tracking mode and active mode.

The OBU may be set into said tracking mode directly after the initialisation of the communication link between the OBU and the RSU.

The specified time limit may be set by the RSU, and may be dependent on certain parameters.

Said parameters is at least one of Type of application, current determined speed of the vehicle, average speed of vehicles during a period of time and day, current traffic situation at the road side station. Slow moving traffic near the RSU means that the time limit between two successive transitions to active mode may be extended in order to save even more power as the time in tracking mode is extended.

Said specified time limit may also be a predetermined time limit pre-programmed into the OBU.

The OBU may comprise a counter counting each transition from said active mode from said tracking mode, and whereby a maximum number of repetition cycles for the transition is set by said RSU, wherein said OBU is set into said sleep mode when said counter has reached said maximum number of repetition cycles. The active mode may be a predetermined mode of operation or active mode may be characterised by the activation of said communication unit while still operating in a different mode, such as tracking mode or sleep mode.

If by any reason the OBU does not receive a release command or similar from the RSU the OBU is set to enter said sleep mode after a maximum number of repetition cycles in order for the OBU not to consume unnecessary power. Reasons for that the OBU may not receive a release command or similar may be external disturbances or signal interferences or that the OBU incorrectly enters into tracking mode, for instance if passing near a tolling station without going through it.

The subject matter also relates to an on board unit (OBU) for communicating with a road side unit (RSU) where said OBU is provided with a communication unit, a timer, and a micro-computer. Said communication unit can be powered off independently of said micro-computer, and said micro-computer can be run in a tracking mode and an active mode, wherein in said tracking mode just a minimum of functions is available, the minimum of functions comprising at least a counter.

The OBU is provided with a power management scheme, i.e. it is a device that utilizes a power saving mode and activates when excited with a certain pattern from the RSU. By providing an OBU according to the above it is possible to realize a transaction where the OBU uses less power during the tracking mode than if it were active throughout the communication zone. By incorporating a data storage the necessary functions and information that has to be loaded after boot-up of the OBU and initialisation of the communication link can be stored in the data storage. Appropriate low power data storage can be accessed swiftly when the functions and/or information are required when the OBU make a transition from tracking mode to active mode.

The communication unit of the OBU may be seen as. different parts in the transmit/receive chain, such as the RF-front end, baseband processor or any other functional block that is necessary to be running while in active mode.

BRIEF DESCRIPTION OF THE DRAWINGS/FIGURES

Further features and advantages, as well as the structure and operation of various embodiments, are described in detail below with reference to the accompanying drawings, in which:

FIG. 1 schematically shows an illustration of a tolling station.

Figure 2:
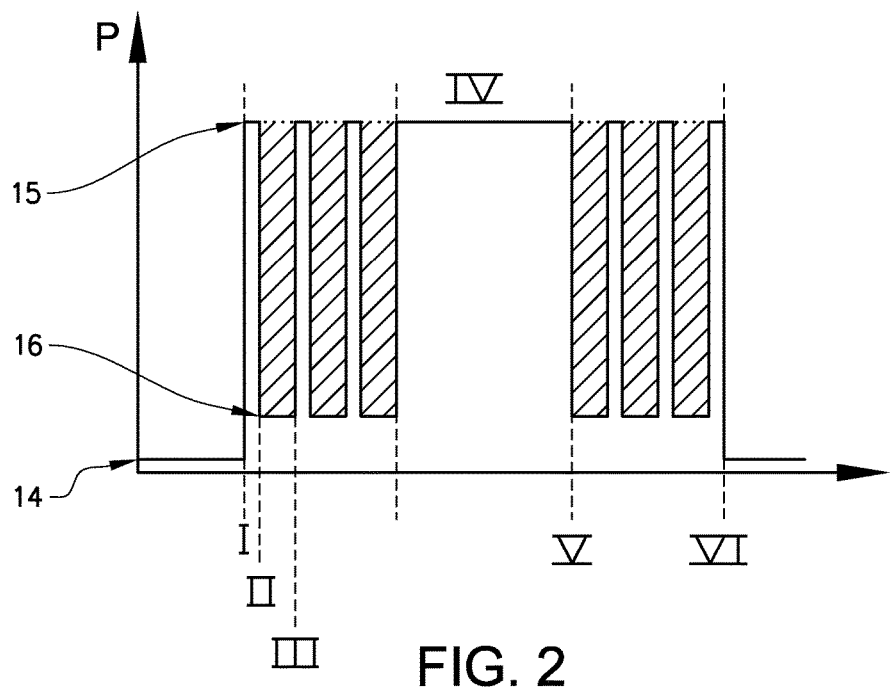

FIG. 2 schematically shows an illustration of the power consumption of the OBU during the different modes when passing through the communication zone of an RSU.

Figure 3:
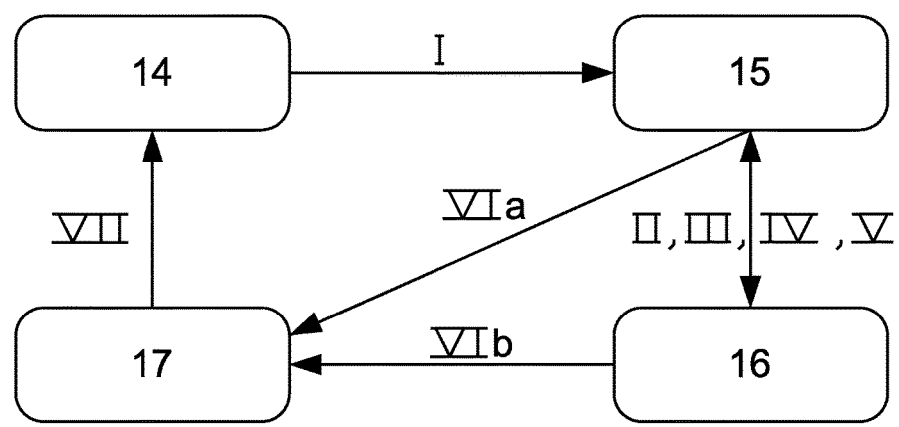

FIG. 3 schematically shows a block diagram over the different modes of the OBU.

Embodiments will now be described with reference to the accompanying drawings.

DETAILED DESCRIPTION

The protocol used for tolling is defined in IEEE 1609.11 and is based on a master-slave concept where the RSU is the master and the OBU is the slave. IEEE 1609.11 is part of the family of standards for Wireless Access in Vehicular Environments (WAVE). One of the basic features of the WAVE standard is that any two WAVE devices can setup an ad-hoc network exchanging information. This inherently means that a WAVE OBU utilizes a full WAVE transceiver and can transmit data itself without any interaction from the RSU.

FIG. 1 schematically shows an illustration of a tolling station 1 that has been set up such that the transaction shall begin at a first predetermined position, i.e. upon entering a transaction zone and be reported at a second predetermined position, i.e. upon entering a reporting zone. The tolling station 1 in FIG. 1 comprises a first lane 2 and a second lane 3. It is of course possible for the tolling station 1 to have more than two lanes. The tolling station 1 comprises a first RSU (TRX #1) controlling the first lane 2 and a second RSU (TRX #2) controlling the second lane 3. The first lane 2 comprises a first communication zone 4 comprising a first tracking zone 5 and a second tracking zone 6. The second lane 3 comprises a second communication zone 7 comprising a third tracking zone 8 and fourth tracking zone 9. A description of the different zones follows.

The first communication zone 4 comprises a first transaction zone 10 wherein a transaction in the first lane 2 takes place. The second communication zone 7 comprises a second transaction zone 11 wherein a transaction in the second lane 3 takes place. In the first lane 2 three vehicles are present illustrating a queue or slow moving traffic. In this case the resulting first transaction zone 10 will be shorter and hence the second tracking zone 6 longer in order track the OBU until the reporting zone is reached. This is also illustrated in the second lane 3 where a single vehicle is present illustrating traffic that flows faster than in the first lane 2. Here the resulting second transaction zone 11 is shown to be longer due to the higher speed of the vehicle. From a power consumption perspective, an OBU travelling in the first lane 2, will consume considerably more power during the tolling passage than the OBU travelling in the second lane 3. The method presented will drastically limit the difference in power consumption for the two different passages by allowing the vehicle to stay in the transaction zone long enough for the transaction to take place while still ensuring that the OBU is not active longer than necessary in the tracking phases.

The first communication zone 4 comprises a first reporting zone 12 where the RSU finishes the communication with the OBU as the vehicle passes through the tolling station 1 and the second communication zone 7 comprises a second reporting zone 13 where the RSU finishes the communication with the OBU as the vehicle passes through the tolling station 1.

FIG. 2 schematically shows an illustration of the power consumption of the OBU during the different modes when passing through a communication zone 4; 7 of an RSU. The x-axis of the diagram represents the transition of a vehicle through a communication zone 4; 7 as described in conjunction to FIG. 1. The y-axis represents power consumption of the OBU.

During normal driving the OBU is in a sleep mode 14 with all functions except a wake-up circuit deactivated. Wake-up circuits are well known in the art and the OBU may be equipped with any suitable wake-up circuit.

When the vehicle equipped with an OBU according to embodiments enters a communication zone 4; 7 of a lane 2; 3 the OBU receives a wake-up command from the RSU controlling the lane 2; 3 and transits to active mode 15. This is illustrated in FIG. 2 by event I. The OBU is active for a short time in order to initiate the communication link with the RSU and to make an initial localization of the OBU by the RSU possible. If the OBU has not reached the predetermined position where the transaction between the OBU and RSU shall begin, i.e. not in a transaction zone 10; 11, the RSU commands the OBU to enter tracking mode 16, illustrated by event II. In the tracking mode 16 the OBU powers down at least the communication unit in order to reduce power consumption. As can be seen from FIG. 2 the power consumption in the tracking mode 16 is considerably lower than in the active mode 15 and only slightly higher than in the sleep mode 14. Typical figures can be that the power consumption in the active mode 15 is a factor of $10^4$ higher than in the sleep mode 14 and that the power consumption in the tracking mode 16 is a factor of $10^3$ lower than in active mode 15. The necessary functions and information required for the OBU to make a prompt transition back to the active state possible is stored in a data storage.

After a time limit has expired the OBU transits back to active mode 15 by starting at least the communication unit, once again transmitting tracking frames comprised of arbitrary data, in order to enable localization of the OBU by the RSU. This is illustrated by event III. If the RSU determines that the OBU has reached the transaction zone, the transaction begins, otherwise the OBU reverts to the tracking mode 16 when the time period the OBU is in active mode 15 as set in the initial command from the RSU has elapsed. A counter keeps track of how many times the transition between active mode 15 and tracking mode 16 has taken place, i.e. how many times the communication unit has been started. Transition between tracking mode 16 and active mode 15 repeats until the OBU enters a transaction zone 10; 11. Here the OBU enters active mode 15 for as long as is necessary to complete the transaction between the RSU and the OBU. This is illustrated by event IV.

When the transaction is complete the OBU enters tracking mode 16 once again in order to continue to send its tracking frames at the intervals as set by the RSU in order for the RSU to track the OBU until the vehicle reaches a reporting zone 12; 13. This is illustrated by event V. In the reporting zone 12; 13 the RSU finalizes the transaction and releases the OBU where after the OBU enters sleep mode 14 once again until a new wake-up command is received. If the transaction is successful or if the time the OBU is in tracking mode 16 exceeds a tracking time limit, the OBU is put in blocked mode 17 before returning to sleep mode 14. This is illustrated by event VI. A receipt of the transaction may be stored in the OBU after the passage of the tolling station 1. If the transaction is not complete no receipt is stored.

As can be seen from FIG. 2 the power consumed during the entire passage is reduced considerably in comparison with if the OBU had been in active mode 15 from the time it entered the communication zone.

FIG. 3 schematically shows a block diagram over the different modes of the OBU.

The modes available in the OBU are sleep mode 14, active mode 15, tracking mode 16 and blocked mode 17. The OBU will make a transition from sleep mode 14 to active mode 15 if a valid wake-up pattern is received; this corresponds to event I in FIG. 2. The OBU makes a transition between the active mode 15 and the tracking mode 16 based on parameters sent from the RSU. The transition between the active mode 15 and tracking mode 16 and vice versa corresponds to events II and III of FIG. 2, respectively, as well as events IV and V representing the transition to active mode 15 for the transaction and the transition back to tracking mode 16 after the transaction is complete and the RSU commands the OBU to revert to tracking mode 16. Parameters may be the desired periodicity of the transmission of tracking frames, maximum receive ontime in every cycle waiting for possible further commands from the RSU and the maximum cycles.

If the number of transitions between tracking mode 16 and active mode 15 exceeds a certain limit or if a tracking time limit is exceeded the OBU makes a transition from tracking mode 16 to blocked mode 17, this corresponds to event VIa in FIG. 2.

Blocked mode 17 is also triggered by a successful transaction whereupon the RSU sends a command to the OBU that the transaction is completed, this is illustrated by VIb. Also, the OBU can make a transition from blocked mode 17 to sleep mode 14 after a specific time has elapsed, this is illustrated by event VII. Blocked mode 17 is primarily used to ensure that the OBU does not connect to the same RSU twice in rapid succession, for instance to ensure that the OBU does not perform a transaction with the same RSU erroneously.

CONCLUSION

Reference signs mentioned in the claims should not be seen as limiting the extent of the matter protected by the claims, and their sole function is to make claims easier to understand.

As will be realised, the invention is capable of modification in various obvious respects, all without departing from the scope of the appended claims. Accordingly, the drawings and the description thereto are to be regarded as illustrative in nature, and not restrictive.

What is claimed is:

1. A method to control an on board unit (OBU) within a communication zone of a road side unit (RSU), said OBU operable to be set into an active mode and a sleep mode, wherein the OBU is set into;
   said sleep mode when said OBU receives a release command from said RSU, and the electronics of said OBU thereby is shut down and at least a portion of a communication unit of said OBU is operable, such that no or a minimum of power is consumed, and
   said active mode when said OBU is entering said communication zone, whereby the communication unit of said OBU thereby is powered such that the OBU can communicate with said RSU, wherein
   said OBU is operable to be set into a tracking mode by said RSU responsive to receiving a command from said RSU, whereby in said tracking mode at least said communication unit is shut down and a timer is activated in said OBU, such that said OBU can restart said communication unit within a specified time limit from when said communication unit is shut down.

2. The method according to claim 1, wherein said OBU boots up to active mode from said sleep mode before being set into said tracking mode.

3. The method according to claim 2, wherein at least one register is kept in a memory of the OBU enabling the OBU to being set into said tracking mode without having to boot up.

4. The method according to claim 1, wherein said OBU is set into said tracking mode directly after the communication link with the RSU has been initialised.

5. The method according to claim 1, wherein said specified time limit is set by the RSU and the specific time limit is dependent on parameters in the RSU.

6. The method according to claim 1, wherein said parameters is at least one of; type of application, determined speed of the vehicle, average speed of passing through the station and time of day.

7. The method according to claim 1, wherein said specified time limit is a predetermined time limit.

8. The method according to claim 1, wherein a said OBU comprises a counter counting each transition from tracking mode to active mode, and whereby a maximum number of repetition cycles for this transition is set by said RSU, wherein said OBU is set into said sleep mode when said counter has reached said maximum number of repetition cycles.

9. An on board unit (OBU) for communicating with a road side unit (RSU), said OBU is provided with, a communication unit, a timer, and a micro-computer,
   wherein said communication unit can be shut off independently of said micro-computer responsive to a communication received from said RSU, and wherein said micro-computer can be run in a tracking mode and an active mode, wherein in said tracking mode just a minimum of functions is available, the minimum of functions comprising at least a counter.

10. The OBU according to claim 9, wherein said OBU is configured to boot up to active mode from said sleep mode before being set into said tracking mode.

11. The OBU according to claim 10, wherein at least one register is kept in a memory of the OBU enabling the OBU to being set into said tracking mode without having to boot up.

12. The OBU according to claim 9, wherein said OBU is configured to be set into said tracking mode directly after the communication link with the RSU has been initialised.

13. The OBU according to claim 9, wherein said specified time limit is set by the RSU and the specific time limit is dependent on parameters in the RSU.

14. The OBU according to claim 9, wherein said parameters is at least one of; type of application, determined speed of the vehicle, average speed of passing through the station and time of day.

15. The OBU according to claim 9, wherein said specified time limit is a predetermined time limit.

16. The OBU according to claim 9, wherein a said OBU comprises a counter counting each transition from tracking mode to active mode, and whereby a maximum number of repetition cycles for this transition is set by said RSU, wherein said OBU is set into said sleep mode by said control unit when said counter has reached said maximum number of repetition cycles.

17. An on board unit (OBU), comprising:
   a communication unit;
   electronics; and
   a processor configured to control the OBU, including to set the OBU into an active mode or a sleep mode within a communication zone of a road side unit (RSU), wherein the processor sets the OBU into;

the sleep mode when the OBU receives a release command from the RSU, the electronics of the OBU is shut down in the sleep mode and at least a portion of the communication unit of said OBU is operable such that reduced power is consumed, and the active mode when the OBU is entering the communication zone such that the communication unit of the OBU is powered to enable the OBU to communicate with the RSU;

wherein the OBU is operable to be set into a tracking mode by the RSU responsive to receiving a command from said RSU, whereby in the tracking mode at least the communication unit is shut down and a timer is activated in the OBU, such that the OBU can restart the communication unit within a specified time limit from when the communication unit is shut down.

18. The OBU of claim 17, wherein the OBU boots up to active mode from the sleep mode before being set into the tracking mode.

19. The OBU of claim 18, wherein at least one register is kept in a memory of the OBU enabling the OBU to being set into the tracking mode without having to boot up.

20. The OBU of claim 17, wherein the OBU is set into the tracking mode directly after a communication link with the RSU has been initialised.

* * * * *